US010523667B2

(12) United States Patent
Sundaram P

(10) Patent No.: US 10,523,667 B2
(45) Date of Patent: Dec. 31, 2019

(54) FRAMEWORK FOR EXECUTING OPERATIONS ON SYSTEMS

(71) Applicant: SAP SE, Walldorf (DE)

(72) Inventor: Meenakshi Sundaram P, Walldorf (DE)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 15/345,893

(22) Filed: Nov. 8, 2016

(65) Prior Publication Data

US 2018/0131691 A1  May 10, 2018

(51) Int. Cl.
*H04L 9/32* (2006.01)
*H04L 29/06* (2006.01)
*H04L 29/08* (2006.01)

(52) U.S. Cl.
CPC ........ *H04L 63/0861* (2013.01); *H04L 67/141* (2013.01); *H04L 67/16* (2013.01); *H04L 67/28* (2013.01); *H04L 9/3213* (2013.01); *H04L 63/0807* (2013.01); *H04L 63/102* (2013.01); *H04L 67/10* (2013.01); *H04L 67/32* (2013.01)

(58) Field of Classification Search
CPC . H04L 67/28; H04L 67/2833; H04L 67/2838; H04L 9/3213; H04L 63/0807
See application file for complete search history.

(56) References Cited

U.S. PATENT DOCUMENTS

| 9,450,936 | B2* | 9/2016 | Chan | H04L 63/168 |
| 2002/0059073 | A1* | 5/2002 | Zondervan | G06F 17/30905 704/270.1 |
| 2005/0021670 | A1* | 1/2005 | Maes | H04L 67/16 709/217 |
| 2008/0288648 | A1* | 11/2008 | Schneider | H04L 63/083 709/229 |
| 2013/0160099 | A1* | 6/2013 | Fitzpatrick, III | H04L 9/3213 726/7 |
| 2015/0012986 | A1* | 1/2015 | Sun | H04W 12/06 726/6 |
| 2015/0256603 | A1* | 9/2015 | Pillai | H04L 67/10 709/246 |

* cited by examiner

*Primary Examiner* — Daniel B Potratz
(74) *Attorney, Agent, or Firm* — Buckley, Maschoff & Talwalkar LLC

(57) ABSTRACT

Methods and system are disclosed that execute an operation associated with a system. In one aspect, upon receiving a request to execute an operation, a connectivity model establishes a connection with a framework. The framework processes the received request and instantiates a system model to execute a user authentication model to authenticate the user initiating the request. Upon authenticating the user, a request model may be executed at the framework. The execution of the request model may process and route the received request to a specific system. Subsequently, a user session may be established by executing a session model at the framework. Upon establishing the user session and receiving the routed request, an operation associated with the request that may be executed may be determined. The determined operation may be executed via the framework.

18 Claims, 5 Drawing Sheets

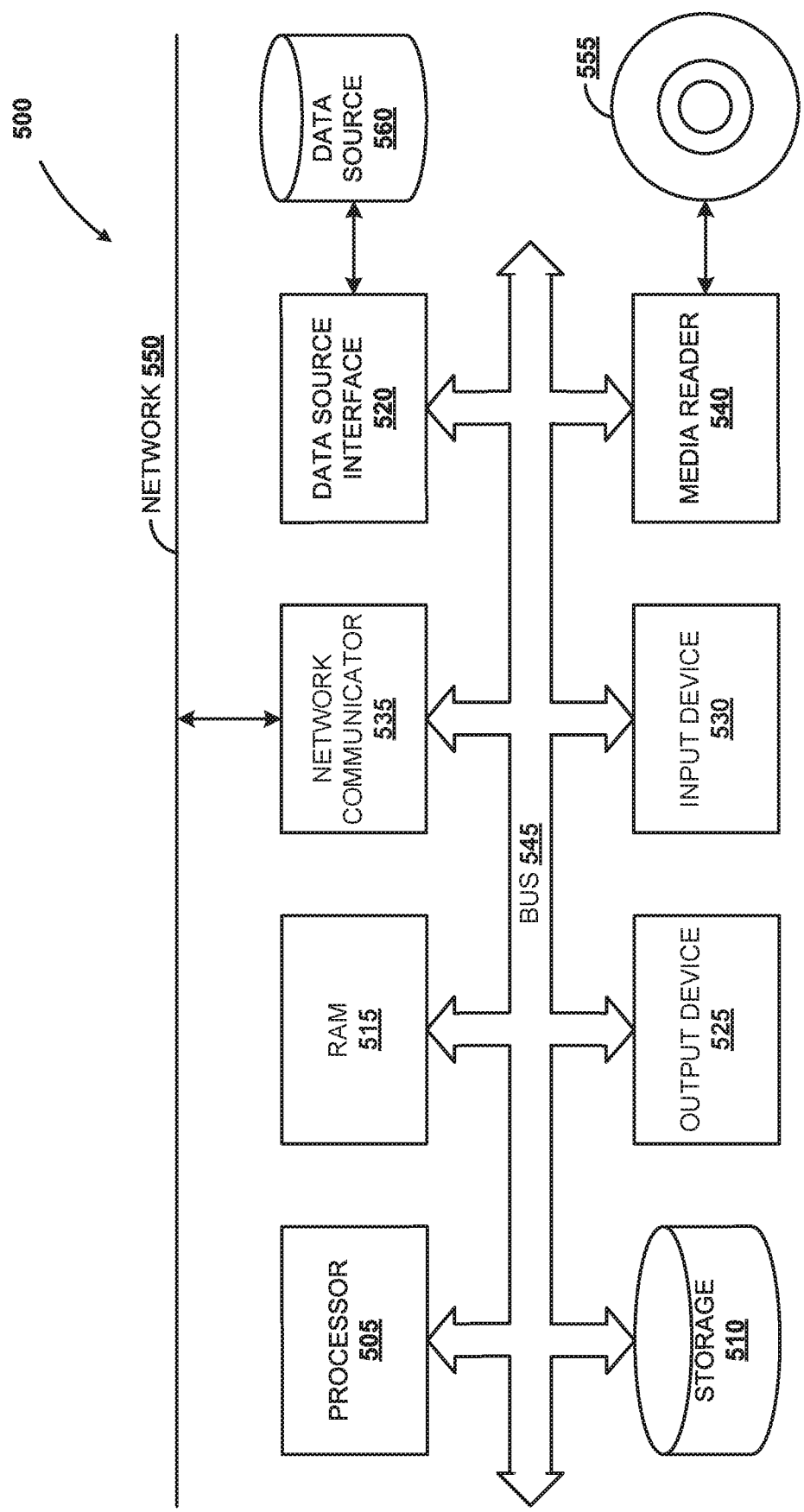

FRAMEWORK FOR EXECUTING OPERATIONS ON SYSTEMS

BACKGROUND

Enterprise systems may be deployed in on premise environments and distributed computing environments. Most of the enterprise systems may be deployed in heterogeneous environments that may be accessed over heterogeneous networks. Thus, such heterogeneous environments may create silos between the enterprise systems when deployed in the on premise or distributed computing environments. Further, the heterogeneous environments may provide fragmented infrastructure which may add to the complexity in integrating the enterprise systems, thereby resulting in undesirable user experiences, redundant user access control mechanisms, etc. Therefore, establishing a framework that may provide a unified architecture for seamlessly integrating the enterprise systems and improve the overall experience for end users may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 5 is a block diagram of a computer system, according to an embodiment.

DETAILED DESCRIPTION

Figure 1:
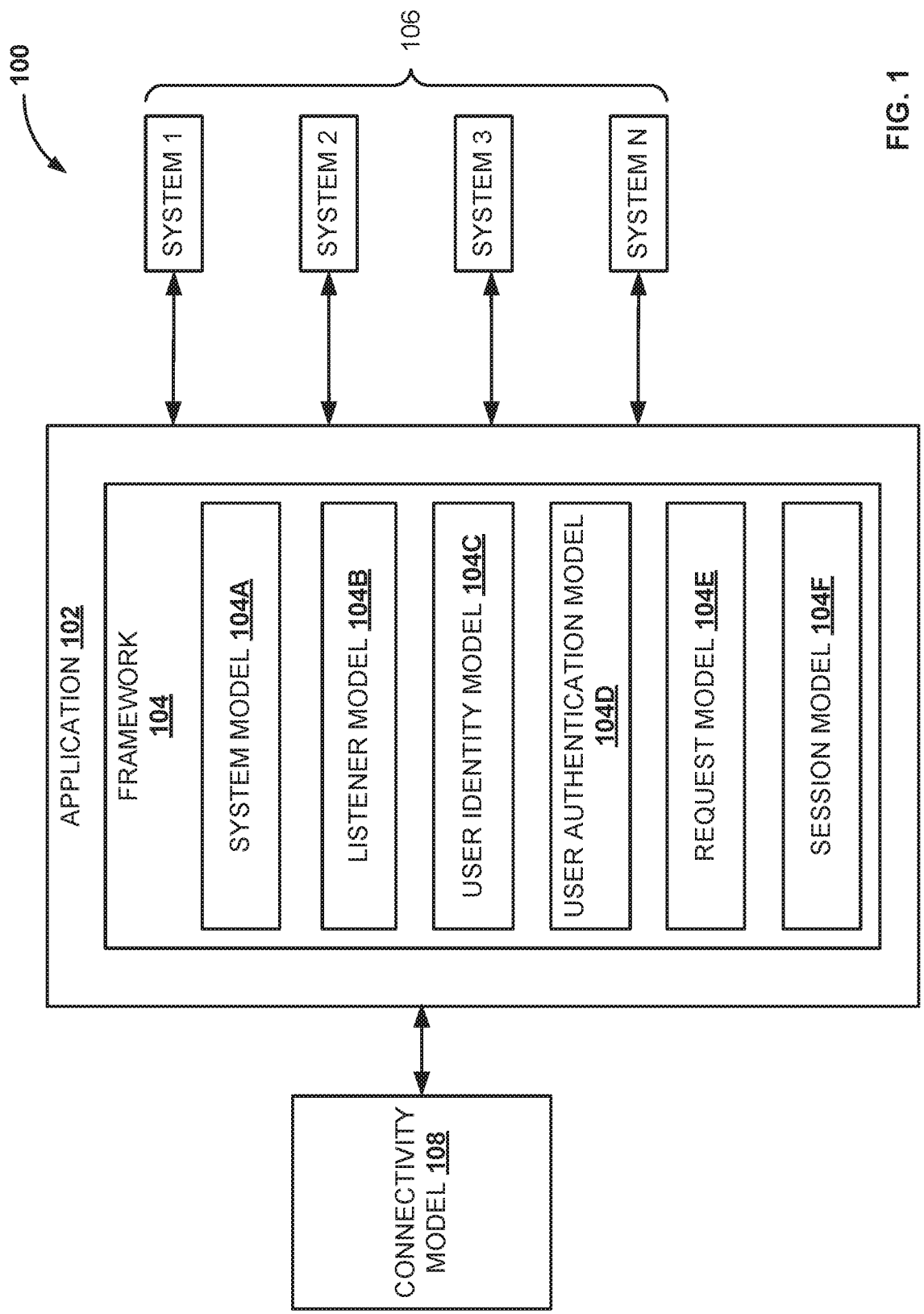
FIG. 1 is a block diagram illustrating an integrated environment to execute operations on corresponding system via an integrated framework, according to an embodiment.

Embodiments of techniques related to framework for executing operations on systems are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Rapid growth of enterprises and technological advancements have propelled a demand for integrated environments. Such integrated environments may provide a platform (e.g., framework) via which a user can interact (e.g., initiate requests for services, execute operations, etc.) with multiple systems and applications. For example, the user interaction may include initiating requests for: consuming data from the multiple systems and applications, execution of operations or functionalities at the multiple systems and applications, etc. In an embodiment, the framework may provide a unified architecture which may be scalable (e.g., on demand, as per business requirement, etc.) for seamless integration of multiple systems and applications (e.g., on demand systems, on premise systems, etc.).

In an embodiment, the unified architecture may provide the user with unified data such that the integrity of the data consumed by the user is consistent and the data is communicated over a secured platform. The unified architecture may also provide reusability of system and application components (e.g., existing user interface (UI) components or applications or parts of applications, data, etc.), thereby optimizing the performance of the systems and applications. In an embodiment, the framework may provide executing operations or functionalities such as, retrieving, storing, replicating user information or data between systems and applications that may be deployed on premise or in distributed environment (e.g., cloud computing environment). The framework may work in cooperation with multiple on premise or cloud platform applications or systems (e.g., proprietary and non-proprietary enterprise systems such as, Partner Relationship management (PRM), Enterprise Resource Planning (ERP), Customer Relationship Management (CRM), Service Mobile Platform (SMP), Ramp-up Knowledge Transfer (RKT), Learning Solutions (LSO), etc.) which may be deployed at a backend in the integrated environment.

In an embodiment, the framework may include an integrated platform of cooperatively functioning software components (singularly referred to a software component or a component), software routines, functional models (e.g., connectivity model, system model, user authentication model, session model, request model, user identity model, etc.), etc., providing execution of specific functionalities or operations. In an embodiment, the terms models, software components, components, software routines, routines, etc., may be used interchangeably and may correspond to an execution of a sequence of instructions by a processor of a computing device (e.g., computer, mobile device, etc.) deployed in the integrated environment. The above functional models, software components, software routines, etc., may be reused based on definition and implementation. Execution of the above functional models, software components, software routines, etc., may provide execution of functionalities or operations such as, instantiation of models, user interface engines, executing operations associated with the multiple systems, etc.

FIG. 1 is a block diagram illustrating integrated environment 100 to execute operations on corresponding systems via an integration framework, according to an embodiment. In an embodiment, FIG. 1 shows application 102 integrated with framework 104 in communication with multiple backend systems 106. The framework 104 may be integrated as a part of application 102 and may be in communication with multiple backend systems 106. e.g., associated data stores and the multiple systems that may be deployed in on premise, cloud computing environments, etc. In another embodiment, framework 104 may be deployed as a middleware between application 102 and multiple backend systems 106.

In an embodiment, framework 104 may include an integration of multiple routines (e.g., sequence of program instructions), operational engines, functional models, software components, etc. The multiple routines, software components, functional models, etc., may execute independently or in cooperation with each other to execute specific functions or operations. The framework 104 may execute functions such as, instantiating functional models, retrieving data from the multiple backend systems (e.g., 106) using data services, replicating the data between multiple backend systems 106, replicating user identities between multiple backend systems 106, authenticating users, establishing and managing user sessions between the multiple systems, receiving and validating requests initiated by the users, processing and routing the requests to a specific backend system (e.g., one of 106), determining operations to be executed, executing the determined operations, sending the response of the execution of operation back to the user, etc.

In an embodiment, a connectivity model 108 (e.g., connectivity system) may work in cooperation with application 102 and framework 104. The execution of connectivity model 108 may provide monitor initiation of users requests, for example, requests for executing operations on multiple backend systems 106 via framework 104. The connectivity model may work in cooperation with multiple interfaces (e.g., web services, smart devices, voice-driven user interfaces, portable electronic devices and systems, etc.). Upon detecting an initiation of the request (e.g., via voice command, web interface, etc.), connectivity model 108 may be instantiated to establish a connection with framework 104 via application 102. Upon establishing the connection, the received request may be processed at framework 104 and system model 104A at framework 104 may be instantiated. The instantiation of system model 104A at framework 104 may instantiate or execute other models, components or routines to service the initiated request. In an embodiment, instantiating system model 104A may execute: listener model 104B to validate the received request, user identity model 104C to manage user identity between the multiple backend systems 106, user authentication model 104D to authenticate the user initiating the request, request model 104E to process and route the received request to a specific application or system (e.g., from multiple backend systems 106), session model 104F to establish a user session between application 102 and multiple backend systems 106 via framework 104; determine execution of an operation on the specific application or system; execute the determined operation on the system via framework 104, etc. In an embodiment, upon executing the requested operation, the response or result of the execution may be returned or sent back to the user who initiated the request.

Figure 2:
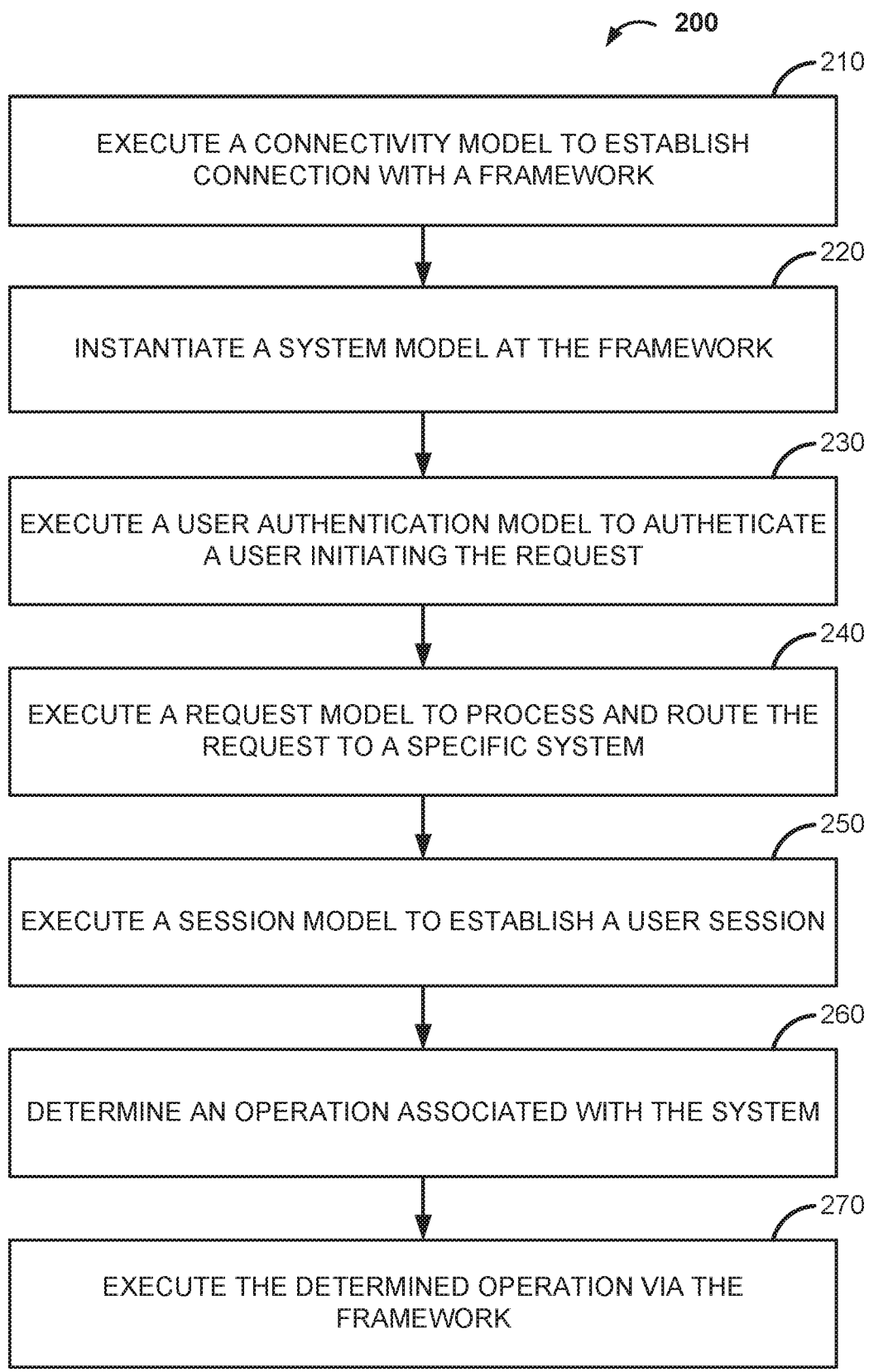
FIG. 2 is a flow diagram illustrating a process to execute an operation on a system via a framework, according to an embodiment.

FIG. 2 is a flow diagram illustrating process 200 to execute an operation on a system via a framework, according to an embodiment. In an embodiment, an operation on a system may be executed via a framework. The framework may be in communication with multiple systems (e.g., enterprise systems and applications, on premise systems, distributed computing systems, cloud computing systems, etc.) and multiple data stores associated with the multiple systems. In an embodiment, the framework may receive a request for executing operation or service via an interface. For example, a user may interact with interfaces such as, web services, smart devices, etc., that may initiate requests for execution of multiple operations and functionalities on the multiple systems via the framework. Additionally, the framework may provide execution of functionalities including access control to multiple related, but independent systems (e.g., single sign-on implementation (SSO)), user sessions management, filtering data based on location (e.g., localization), user role assignments (e.g., employee, manager, vice president, etc.), etc. Other functionalities supported by the framework may include enhancing graphical appearance of the data using graphical control elements, window size and shapes, routing the received requests to specific systems (e.g., on premise systems, cloud computing systems, etc.), determining operations associated with the systems, executing the associated operations, etc.

In an embodiment, upon receiving a request, a connectivity model is executed to establish a connection with a framework, at 210. Execution of the connectivity model may establish a secured and reliable connection between the interface and the framework. In an embodiment, a request initiated from a user via the interface may correspond to executing a specific operation on the system in communication with the framework. For example, the operation may include a request to create an appointment, make an online reservation of tickets, compose and send an email, etc. Based on the type and nature of the request, the request may be routed to specific systems via the framework. In an embodiment, the systems and applications executing the requested operations or functionalities may be deployed on mobile on tablet computers, mobile devices, multifunction portable electronic devices, etc.

In an embodiment, upon processing the received request, a system model is instantiated at the framework, at 220. The system model may provide a platform for executing multiple models (e.g., data models, functional models, operational models, etc.) as routines in cooperation with each other. Such models or routines may be configurable and provide functionalities such as, user authentication, establishing user sessions, determining the parameters in the request, determining types of request, processing and routing requests to specific systems based on the determined parameters and types of the request, determining operations to execute on specific systems, etc. In an embodiment, a user authentication model is executed to authenticate a user initiating the request, at 230. The requests may be processed and operations may be executed via the framework upon authenticating the user initiating the request. The user credentials and determining providing access to the systems may be validated by the execution of the user authentication model. In an embodiment, the user authentication model may work in cooperation with a secure listener model (also referred to as a secure listener interface) to validate the received request. For example, the listener model may validate the received request based on the parameters such as, access tokens, associated the request.

In an embodiment, upon authenticating the user, the received request may be processed and routed to a specific system. In an embodiment, a request model is executed to process and route the request to a specific system, at 240. The execution of the request model may provide executing operations such as, determining tokens associated with the request, determining the type of received request, determining the system to which the request is to be routed, etc. Upon such determinations, the request may be routed to the determined system, etc. In an embodiment, a decision logic to determine the system to which the request may be routed may be based on parameters associated with the received request. For example, such parameters may include the tokens associated with the request, user access information, type of initiated requests, etc. In an embodiment, a session model is executed to establish the user session, at 250. The framework may cooperatively work in conjunction with user interface engine that may provide user interfaces to configure the user session. For example, the user session may be configurable via user interfaces associated with setup and configuration of user sessions. Various parameters associated with the user sessions, such as time period of the user session, detection of activity via the user session, etc., may be configured. The user session may also be configured to be active a predetermined time period. The session model may monitor user activities over the sessions and initiate termination of the user session when inactivity may be detected after an elapse of the predetermined time period. Upon establishing the user session and receiving the routed request, an operation associated with the system is determined, at 260. The determined operation associated with the system is executed via the framework, at 270.

In an embodiment, multiple users may initiate multiple requests for executing operations via the framework. In such a scenario, the framework may manage identities of user via a user identity model. In an embodiment, the user identity model may work in cooperation with the user authentication model to execute operations such as, managing user registrations, storing user information and generating user identities, validating user identities (e.g., user roles, profiles and access control to data, access control to specific systems, etc.), managing user authorization or authentication, etc.

In an embodiment, the framework may be integrated with an application layer or may be configured as a middleware in the system. A user may interact with the framework via the application layer and consume services or operations via the framework. For example, the user may initiate requests via interfaces (e.g., web interfaces (e.g., web browser, web services, etc.), smart devices (e.g., mobile devices, portable electronic devices, smart speakers, etc.)), etc., over a network (e.g., Local Area Network, Bluetooth, Internet, Virtual Private Network (VPN) etc.) at the application layer. In an embodiment, the smart devices may provide interfaces such as, touch screen user interfaces, voice-driven user interfaces, haptic interface, etc., for initiating the requests. In an embodiment, an internal microphone on the smart device may cooperatively work with an intelligent voice driven platform (e.g., intelligent personal assistant) to manage (e.g., receive and process) requests initiated via voice-driven user interface. For example, the smart device may be activated when the intelligent voice driven platform detects a presence of specific words. In an embodiment, the smart device may include voice recognition and processing platform to receive and process requests for executing operations such as, music playback, making to-do lists, setting alarms, streaming videos, playing audio books, provide real time information on weather, traffic, etc., making online reservations, home automation, etc.

Figure 3:
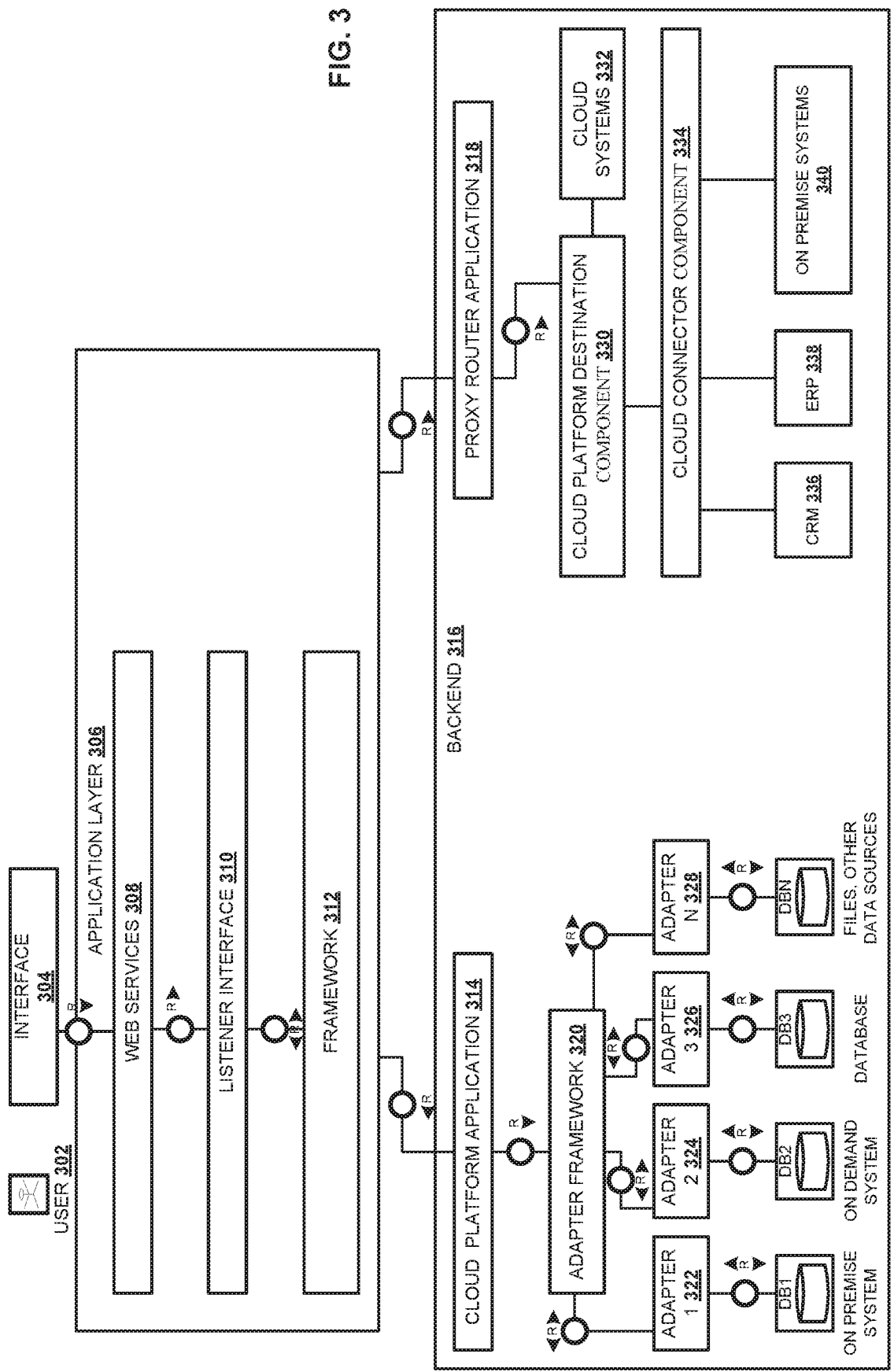
FIG. 3 is a block diagram illustrating a high level architecture to execute an operation on a system via a framework, according to an embodiment.

FIG. 3 is a block diagram illustrating a high level architecture to execute an operation associated with a system via a framework, according to an embodiment. FIG. 3 shows a high level architecture including application layer 306 integrated with framework 312 in communication with backend 316. In an embodiment, framework 312 may be integrated with application layer 306 or may be configured to be deployed as a middleware (e.g., between application layer 306 and backend 316). The user 302 may initiate execution of operations or functions that may be executed on the systems and may be consumed by user 302 at application layer 306 via framework 312. The application layer 306 may provide a platform for user 302 to interact with multiple systems and associated data stores (e.g., DB1 on premise system, DB2 on demand system, DB3 database, DBN Files, other data sources, CRM 336, ERP 338, other on premise systems 340, etc.) at backend 316 via framework 312. For example, when user 302 initiates a request, a connectivity model (e.g., that is in communication via interface 304 with user 302 and application layer 306) may establish a connection with framework 312 in application layer 306. The connectivity model may cooperatively work with interfaces (e.g., web interfaces, smart devices, etc.) to detect and receive requests, establish a connection with framework 312, etc. In an embodiment, connection with framework 312 may be established via cooperation with web services component 308 and listener interface component 310 in application layer 306. For example, a user system internet protocol (IP) address may include a specific port address that may work in cooperation with a common handshake IP address of connectivity model 108 (or system) which in turn may work in cooperation with external IP address and a specific port and internal IP address.

In an embodiment, application layer 306 including the framework 312 may provide access to and execute operations on multiple systems at backend 316. The framework 312 may provide a platform for executing operations, such as validating the received requests (e.g., by working in cooperation with listener model or listener interface 310), user authentication (e.g., by working in cooperation with user authentication model), managing user identities (e.g., by working in cooperation with user identity model), establishing user sessions with backend 316 (e.g., by working in cooperation with the session model), processing and routing the received requests to a specific system (e.g., by working in cooperation with the request model), determining an operation to be executed on the specific system, etc. In an embodiment, the user identity model may work in cooperation with the session model to manage user identities and establish connection with the respective systems in backend 316. In an embodiment, the user authentication model may authenticate users using OAuth, which provides a platform for authorizing users using third party service providers. Such a platform may provide secured access to the systems at backend 316, which may include authorizing the users using tokens (e.g., access tokens). The tokens may be embedded in the requests initiated by users 302 and may include information associated with user identities that may be used to authorize users 302.

In an embodiment, backend 316 may include an integration of multiple systems and/or associated data stores (e.g., DB1 on premise system, DB2 on demand system, DB3 database, DBN Files, other data sources, CRM 336, ERP 338, other on premise systems 340, etc.) in communication with framework 312. The requests initiated via application layer 306 for executing operations on multiple systems at backend 316 may be routed via cloud platform application 314 and proxy router application 318. The cloud platform application 314 may include an integration of multiple applications and may provide a platform for application services. In an embodiment, cloud platform application 314 may work in cooperation with adapter framework 320, which may include an integration of multiple adapters (e.g., 322, 324, 326, 328) in communication with the respective data stores (e.g., DB1, DB2, DB3, DBN, etc.) of the systems. The adapter framework 320 may access, retrieve and provide data by executing the routines and stored procedures. The adapter framework may include an integration of application package interfaces (APIs) to communicate with data stores (e.g., DB1, DB2, DB3, DBN, etc.) associated with multiple systems. The adapter framework 320 may be configured to access data different formats that may be stored in data stores (e.g., DB1, DB2, DB3, DBN, etc.). In an embodiment, adapter framework 320 may be configured to provision real-time functional status and availability of data stores (e.g., DB1, DB2, DB3, DBN, etc.). For example, the data stores (e.g., DB1. DB2, DB3, DBN, etc.) may attain temporarily non-functional status. When such a non-functional status is detected, adapter framework 320 may access the business data persisted in the persistency layer of data stores (e.g., DB1, DB2, DB3, DBN, etc.). In an embodiment, the user access information may be propagated to data stores (e.g., DB1, DB2, DB3, DBN, etc.) via adapter framework 320. For example, when the request requests for accessing data stored in the data store, the request including the user query may be pushed down to the respective data store via the adapter and data may be retrieved in a standard format (e.g., Java Script Object Notation (JSON) format).

In an embodiment, based on the type of received request, the request model at framework 312 may route the received request to proxy router application 318 or cloud platform application 314. For example, when the received request includes queries, the request may be routed to adapter framework 320 via cloud platform application 314. The request may be routed to the specific data store (e.g., DB1, DB2, DB3 and DBN) via the respective adapter (e.g., 322, 324, 326 and 328). The adapter framework 320 may be configured to determine information related to connectivity of the databases and the multiple systems at backend 316. Accordingly, adapter framework 320 may route the specific query to the respective data store by establishing a temporary communication channel (e.g., temporary tunnel) real time between the data stores (e.g., DB1, DB2. DB3 and DBN) and adapter framework 320.

In an embodiment, a transaction context may be maintained between multiple applications (e.g., systems at backend 316) by components, such as a root transaction, link transaction and routed transaction (not shown). The above components may maintain a valid transaction context including session variables, transaction token to track the order of query execution between different applications in the user session.

In an embodiment, the root transaction is initiated by the user (the current transaction context) which may instantiate or trigger the link transaction based on the request type which is the first physical connection of a logical session and the context is tracked using the transaction token, session variables, metadata and stored in a temporary table. The order of query execution is tracked and stored temporarily to have the whole transaction context to maintain the transactional integrity between multiple applications running on the same data stores. Based on the events created in link transaction, different routed transactions are getting created to ensure the needed transactional integrity of the data stores. In an embodiment, the transaction context may be tracked via the transaction token.

In an embodiment, when the request model processes the received request and determines that the request is routed to proxy router application 318, the target system that may execute the requested operation may be identified. Upon determining the target system, information related to connectivity with the target system may be determined by cloud platform destination component 330. For example, the target system that may execute the requested operation may be deployed in cloud computing environment (e.g., cloud systems 332) or on premise systems 340. In an embodiment, when cloud platform destination component 330 determines target system is deployed on cloud systems 332, the received request may be routed to the specific cloud system via a cloud destination component (not shown). When cloud platform destination component 330 determines that the target system is deployed in on premise systems 340, the request may be routed to the specific on premise system via cloud connector component 334.

In an embodiment, cloud connector component 334 may provide a platform for securely connecting with the systems and applications deployed on the on premise systems over a network. The cloud connector component 334 may cooperatively work with cloud systems 332 and on premise systems 340 without exposing the functionalities of the cloud systems 332 and on premise systems 340. The cloud connector component 334 may execute as an on premise agent in a secured network and provide characteristics, such as a reverse invoke proxy between on premise applications (or on premise systems 340) and the cloud computing applications (or cloud systems 332). The reverse invoke proxy characteristic may eliminate a need for deploying a firewall between cloud systems 332 and on premise systems 340. The reverse invoke proxy characteristic may also provide granular level control over cloud systems 332 and on premise systems 340.

In an embodiment, upon detecting a termination in connections, cloud connector component 334 may re-establish connections between cloud systems 332 and on premise systems (e.g., 336, 338, 340, etc.). The cloud connector component 334 may provide additional functionalities such as, audit logging for inbound or outbound data, detecting modifications in the configuration settings (e.g., configuration and setup for user sessions), propagating user identities on cloud systems 332, on premise systems 340, etc. In an embodiment, the request may be routed from cloud connector component 334 to specific system at backend 316 (e.g., enterprise systems like CRM, ERP, etc.). The cloud connector component 334 may dynamically create a user certificate for each user that may be used to access the specific systems at the backend 316. For example, the certificate may be created and transmitted via secured connections (e.g., https). In an embodiment, upon routing the request to specific system, the operations may be executed and the output of the execution (e.g., response) may be sent to user 302 initiating the request. In an embodiment, cloud systems 332 may be accessed on demand over a network (e.g., Internet) and on premise systems 340 may be accessed via a firewall in the network.

In an embodiment, a request may be initiated by a user to consume data stored in data stores associated with the systems at backend 316. The framework 312 provides a platform to access and provision data to the user from multiple systems or applications that may provide specific functionalities or execute specific operations. In an embodiment, when the user initiates the request from the smart device, the connectivity model in cooperation with interface 304, web services 308, listener interface 310 and the user authentication model may establish the connection and authenticate the user (e.g., using OAuth). In an embodiment, established connection may be configured via a user interface provided by framework 312. Upon configuring the connections, the connectivity model in cooperation with the user identity management model may authenticate the user initiating the requests using the tokens in the request.

In an embodiment, when a request is initiated via a voice-driven user interface, the request may include OAuth token which may be associated with user 302. For example, user 302 may establish the connection with framework 312 via the connectivity model and the OAuth token may be used to validate or authenticate user 302. In an embodiment, voice intents in the voice-driven user interface may be configured via user interfaces associated with the connectivity model. When the user authentication fails, the user may be blocked from accessing the systems. In an embodiment, the user identity model may be propagated onto cloud systems 332 which enables the user to access the applications on the cloud systems. Propagating the user identities may include propagating the user information, OAuth tokens associated with the user. When the request is associated with executing an operation on cloud system, the user account on the cloud system may be validated and linked with the user account on the smart device (e.g., via user identity propagation). A user may be notified upon establishing a secured connection and based on the OAuth token, the user may be provided or restricted access to certain systems in backend 316.

In an embodiment, upon establishing the connection, the smart device in cooperation with the connectivity model and the user authentication model may validate the user initiating the request. For example, when the request is initiated via the voice driven user interface, voice authentication and validation routines may be executed at framework 312. Execution of such routines may prevent misuse of the systems or applications by detecting voice imitations by another user.

In an embodiment, upon validating the user by executing the voice authentication and validation routines, the user may initiate or make requests for executing specific operations associated with the systems (e.g., on premise systems 340 or cloud systems 332). In an embodiment, listener model (e.g., listener interface 310) may be executed which may validate the received request, monitor and manage the lifecycle of the user session (e.g., login, logout, etc.,) by working in cooperation with the session management model. The user session may be terminated when the listener model working in cooperation with user session model detects inactivity for a certain period of time (e.g., predefined time limits and thresholds based on type of requests). When the user requests to logout of framework 312, listener interface 310 in cooperation with session model, may execute routines for terminating the user session. The context of transaction with the data stores may be maintained at mutually consistent state, when multiple data stores are accessed. Accordingly, user 302 may be notified about the session termination/logout.

In an embodiment, the user authentication model may be configured to provide multi form factor authentication. For example, such multi form authentication may include using mobile devices for One Time Passwords (OTPs), secure identifier, etc. Such multi form factor authentication may prevent misuse of smart devices, user identities, etc. Once the user is authenticated and secure connection is established, user 302 may execute multiple tasks such as, consuming data from multiple data stores (e.g., DB1, DB2, DB3, DBN, etc.), initiating requests for executing operations from specific systems or applications, etc. In an embodiment, when the user authentication fails, user 302 may be blocked from accessing the systems or executing any further tasks.

In an embodiment, framework 312 may include routines related to smart data integration component and smart data access component. The execution of the above routines may establish connections with multiple data stores via adapter framework 320. In an embodiment, the smart data integration component may execute to provide data at a high speed in real-time and execute operations such as, data replication, data transformation between on premise systems 340 and cloud systems 332, establishing connections with remote systems (e.g., 336, 338, etc.,), etc. In an embodiment, proxy router application 318 may establish connections with multiple backend systems via cloud platform destination component 330 (e.g., when connecting with cloud systems 332) or cloud connector component 334 (e.g., when connecting with CRM 336, ERP 338, or on premise systems 340, etc.). Upon executing the requested operation, the result of the execution may be sent back to user 302 via cloud platform application 314 or proxy router application 318, framework 312, listener interface 310, web services 308, and interface 304.

In an embodiment, the above discussed integrated environment of connectivity model, the framework and the backend may be used to execute multiple operations or functionalities by user 302. For example, requests may be initiated to execute operations such as, creating follow-up documents from different systems or applications (e.g., CRM 336, ERP 338, etc.) via voice driven user interfaces, smart devices, mobile devices, portable electronic devices, etc. In an embodiment, based on the nature of service request, user 302 may create a follow-up travel request.

In an embodiment, framework 312 may provide a platform for establishing connection with multiple systems. An end user may consume data or services as operations from the multiple systems (e.g., cloud systems. 332, CRM 336, ERP 338, other on premise systems 340, etc.) via framework 312. The platform provided by framework 312 may be scalable and provision seamless integration of on demand systems and applications (e.g., cloud systems 332) and on premise systems 340 and applications. The multiple systems and applications (e.g., cloud systems, 332, CRM 336, ERP 338, other on premise systems 340, etc.) may leverage on the platform infrastructure provided by framework 312. The framework 312 may provide platform for unified data quality reporting, real-time business process integration, seamless integration of new systems and applications, cross application reporting, higher flexibility and scalability of systems, etc.

Figure 4:
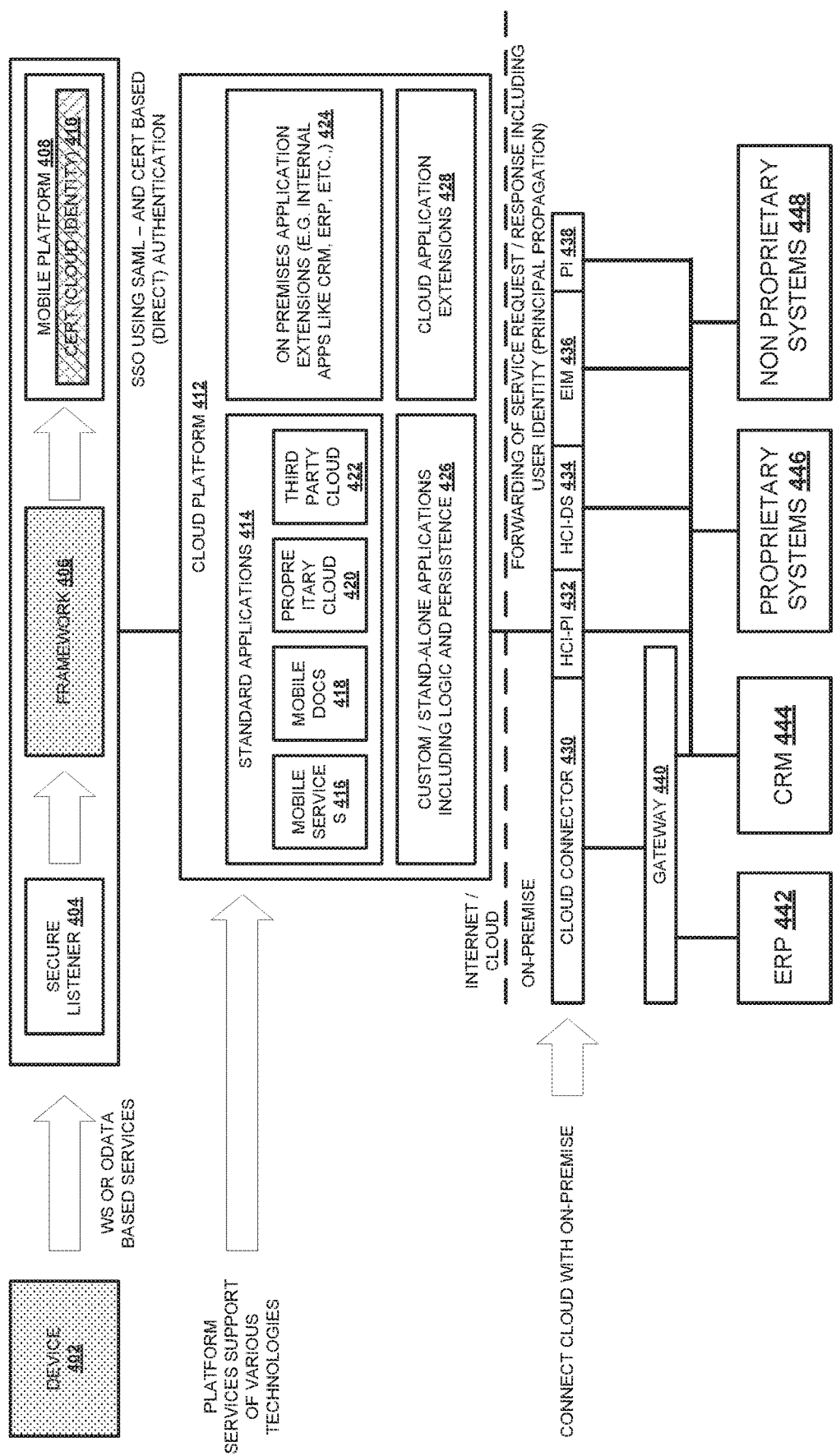
FIG. 4 is a block diagram illustrating an execution of an operation on a system via a framework, according to an embodiment.

FIG. 4 is a block diagram illustrating an execution of an operation on a system via a framework, according to an embodiment. In an embodiment, a user may initiate a request via a smart device (e.g., device 402). As discussed previously, the initiated request may be routed using data services (e.g., web service (ws) or OData based services) to framework 406 via secured listener 404. To execute the requested operations, framework 406 may work in cooperation with mobile platform 408 (e.g., using services such as CERT for cloud identity 410) or cloud platform 412 or on premise systems (e.g., ERP 442, CRM 444, proprietary systems 446, nonproprietary systems 448, etc.) via gateway 440.

In an embodiment, cloud platform 412 may provide or support multiple platforms or technologies via standard applications 414 (e.g., that may be consumed as or through mobile services 416, mobile does 418, proprietary cloud 420 applications, third part cloud applications 422, etc.), on premises application extensions 424 (e.g., internal applications such as CRM 444, ERP 442, etc.), customized or standalone applications including logic and persistence 426, cloud application extensions 428, etc. The cloud platform 412 and the applications, extensions, etc., deployed therein may be accessed and operations or services consumed via internet.

In an embodiment, the on premise systems (e.g., ERP 442, CRM 444, proprietary systems 446, nonproprietary systems 448, etc.) may be in communication with cloud platform 412 via cooperation between gateway 440 and components (e.g., connect cloud with on premise such as cloud connector 430, and other components, such as HCI-PI 432. HCI-DS 434, EIM 436, PI 438, etc.). The cooperation between the cloud platform 412 and the on premise systems (e.g., ERP 442, CRM 444, proprietary systems 446, nonproprietary systems 448, etc.) may provide execution of functionalities or operations on various systems or applications deployed in the cloud platform 412 or on premise systems or applications, forwarding service requests/response including principal propagation of user identities between the systems and applications. As explained previously, the user initiating requests, may consume the execution of services or operations on systems or applications via framework 406.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 5 is a block diagram of an exemplary computer system 500, according to an embodiment. Computer system 500 includes processor 505 that executes software instructions or code stored on computer readable storage medium 555 to perform the above-illustrated methods. Processor 505 can include a plurality of cores. Computer system 500 includes media reader 540 to read the instructions from computer readable storage medium 555 and store the instructions in storage 510 or in random access memory (RAM) 515. Storage 510 provides a large space for keeping static data where at least some instructions could be stored for later execution. According to some embodiments, such as some in-memory computing system embodiments, RAM 515 can have sufficient storage capacity to store much of the data required for processing in RAM 515 instead of in storage 510. In some embodiments, all of the data required for processing may be stored in RAM 515. The stored instructions may be further compiled to generate other representations of the instructions and dynamically stored in RAM 515. Processor 505 reads instructions from RAM 515 and performs actions as instructed. According to one embodiment, computer system 500 further includes output device 525 (e.g., a display) to provide at least some of the results of the execution as output including, but not limited to, visual information to users and input device 530 to provide a user or another device with means for entering data and/or otherwise interact with computer system 500. Each of these output devices 525 and input devices 530 could be joined by one or more additional peripherals to further expand the capabilities of computer system 500. Network communicator 535 may be provided to connect computer system 500 to network 550 and in turn to other devices connected to network 550 including other clients, servers, data stores, and interfaces, for instance. The modules of computer system 500 are interconnected via bus 545. Computer system 500 includes a data source interface 520 to access data source 560. Data source 560 can be accessed via one or more abstraction layers implemented in hardware or software. For example, data source 560 may be accessed by network 550. In some embodiments data source 560 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments.

One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to execute an operation associated with a system, comprising:
   upon receiving a request, establishing a connection with a framework;
   upon processing the received request, instantiating, by a processor of the computer, a system model at the framework, to:
      instantiate a user authentication model to authenticate a user initiating the request;
      upon authenticating the user, process and route the received request to the system based on:
         determining, by the processor of the computer, one or more tokens associated with the received request;
         determining, by the processor of the computer, a type of received request;
         based on the determined one or more tokens and the type of received request, determining, by the processor of the computer, the system to which the received request is to be routed;
         routing, by the processor of the computer, the received request to the determined system; and
         maintaining a transaction context as the received request is routed to the determined system, wherein the transaction context includes one or more session variables and the tracking of an order of query execution including at least one query;
      establish a user session;
   upon establishing the user session and receiving the routed request of the at least one query, determine executing an operation associated with the system based on the routed request; and
   executing, by the processor of the computer, the determined operation associated with the system via the framework.

2. The computer implemented method of claim 1, further comprises: validating, by the processor of the computer, the received request by executing a secure listener at the framework.

3. The computer implemented method of claim 1, further comprising:
   validating, by the processor of the computer, user identities associated with one or more users initiating one or more requests; and
   upon validation, establishing, by the processor of the computer, the user session for the one or more users initiating the one or more requests.

4. The computer implemented method of claim 1, wherein the request is selected from a group consisting of a request initiated via web services, smart devices or a combination thereof.

5. The computer implemented method of claim 1, further comprising: validating the user initiating the request at the framework, when the request is initiated via a voice driven user interface.

6. The computer implemented method of claim 1, further comprising: providing one or more user interfaces to configure one or more user sessions initiating the one or more requests.

7. The computer implemented method of claim 1, further comprising:
   receiving two or more requests;
   determining, by the processor of the computer, two or more tokens embedded within the received two or more requests;
   routing, by the processor of the computer, the received two or more requests to the determined system; and
   authorizing one or more users using the two or more tokens.

8. A computer system to execute an operation associated with a system, comprising:
   a memory storing computer instructions; and
   a processor communicatively coupled with the memory to execute the instructions to perform operations comprising:
      upon receiving a request, execute a connectivity component to establish a connection with a framework;
      upon processing the received request, instantiate a system component at the framework, to:
         instantiate a user authentication model to execute a user authentication component to authenticate a user initiating the request;
         upon authenticating the user, execute, a request component to process and route the received request to the system based on:
            determining, by the processor of the computer, one or more tokens associated with the received request;
            determining, by the processor of the computer, a type of received request;
            based on the determined one or more tokens and the type of received request, determining, by the processor of the computer, the system to which the received request is to be routed;
            routing, by the processor of the computer, the received request to the determined system; and
            maintaining a transaction context as the received request is routed to the determined system, wherein the transaction context includes one or more session variables and the tracking of an order of query execution including at least one query;

execute a session component to establish a user session;

upon establishing the user session and receiving the routed request of the at least one query, determine executing an operation associated with the system based on the routed request; and execute the determined operation associated with the system via the framework.

9. The computer system of claim 8, wherein executing the user authentication component, comprises: validating the received request by executing a secure listener component at the framework.

10. The computer system of claim 8, further comprising: executing a user identity component at the framework, comprising:

validating user identities associated with one or more users initiating one or more requests; and upon validation, establishing the user session for the one or more users initiating the one or more requests.

11. The computer system of claim 8, wherein the request is selected from a group consisting of a request initiated via web services, smart devices or a combination thereof.

12. The computer system of claim 8, further comprising: executing a voice authentication and validation routine to validate the user initiating the request at the framework, when the request is initiated via a voice driven user interface.

13. The computer system of claim 8, further comprising: providing one or more user interfaces to configure one or more user sessions initiating the one or more requests.

14. A non-transitory computer readable storage medium tangibly storing instructions, which when executed by a computer, cause the computer to execute operations comprising:

upon receiving a request, execute a connectivity model to establish a connection with a framework;

upon processing the received request, instantiate a system model, at the framework, to:

instantiate a user authentication model to execute a user authentication model, to authenticate a user initiating the request;

upon authenticating the user, execute a request model, to process and route the received request to the system based on:

determining, by the processor of the computer, one or more tokens associated with the received request;

determining, by the processor of the computer, a type of received request;

based on the determined one or more tokens and the type of received request, determining, by the processor of the computer, the system to which the received request is to be routed;

routing, by the processor of the computer, the received request to the determined system; and maintaining a transaction context as the received request is routed to the determined system, wherein the transaction context includes one or more session variables and the tracking of an order of query execution including at least one query;

execute a session model, to establish a user session;

upon establishing the user session and receiving the routed request of the at least one query, determine executing an operation associated with the system based on the routed request; and execute the determined operation associated with the system via the framework.

15. The non-transitory computer readable storage medium of claim 14, wherein executing the user authentication model, comprises: validating the received request by executing a secure listener model at the framework.

16. The non-transitory computer readable storage medium of claim 14, executing a user identity model at the framework, comprising:

validating user identities associated with one or more users initiating one or more requests; and upon validation, establishing the user session for one or more users initiating the one or more requests.

17. The non-transitory computer readable storage medium of claim 14, wherein the request is selected from a group consisting of a request initiated via web services, smart devices or a combination thereof.

18. The non-transitory computer readable storage medium of claim 14, further comprising: executing a voice authentication and validation routine to validate the user initiating the request at the framework, when the request is initiated via a voice driven user interface.

* * * * *